United States Patent
Liao (10) Patent No.: US 10,807,112 B2
(45) Date of Patent: Oct. 20, 2020

(54) FILLING DEVICE

(71) Applicant: LIH YANN INDUSTRIAL CO., LTD., Taichung (TW)

(72) Inventor: Po-Lin Liao, Taichung (TW)

(73) Assignee: LIH YANN INDUSTRIAL CO., LTD., Taichung (TW)

( * ) Notice: Subject to any disclaimer, the term of this patent is extended or adjusted under 35 U.S.C. 154(b) by 37 days.

(21) Appl. No.: 16/223,560

(22) Filed: Dec. 18, 2018

(65) Prior Publication Data

US 2020/0188943 A1   Jun. 18, 2020

(51) Int. Cl.

| | |
|---|---|
| B05B 7/24 | (2006.01) |
| H01M 2/36 | (2006.01) |
| B67D 7/42 | (2010.01) |
| B05B 11/00 | (2006.01) |
| B67D 7/02 | (2010.01) |
| B67D 7/00 | (2010.01) |

(52) U.S. Cl.
CPC ........ B05B 7/2408 (2013.01); B05B 11/3052 (2013.01); B67D 7/0288 (2013.01); B67D 7/42 (2013.01); H01M 2/36 (2013.01); B67D 7/005 (2013.01)

(58) Field of Classification Search
CPC . B05B 7/2408; B05B 11/3052; B67D 7/0288; B67D 7/42; B67D 7/005; H01M 2/36
USPC .......................................................... 141/27
See application file for complete search history.

(56) References Cited

U.S. PATENT DOCUMENTS

| | | | | |
|---|---|---|---|---|
| 295,009 | A * | 3/1884 | Hogan | B67D 7/005 141/353 |
| 2,568,566 | A * | 9/1951 | Sokolik | A61M 1/0084 604/26 |
| 2,668,655 | A * | 2/1954 | Bowering | F04C 25/00 418/5 |
| 2,692,558 | A * | 10/1954 | Garrett | F04D 13/16 417/38 |
| 2,718,343 | A * | 9/1955 | Brown | F16K 21/20 141/94 |
| 2,738,106 | A * | 3/1956 | Lutz | G01F 11/08 222/207 |
| 2,819,928 | A * | 1/1958 | Liedberg | B05B 7/24 239/304 |
| 3,035,575 | A * | 5/1962 | Broman | A61M 5/1424 604/185 |
| 3,141,585 | A * | 7/1964 | Emmert | B01J 4/02 222/434 |
| 3,301,282 | A * | 1/1967 | Fresolon, Jr. | B60T 17/222 141/98 |
| 3,372,716 | A * | 3/1968 | Hommel | B67D 7/725 141/59 |

(Continued)

Primary Examiner — Timothy L Maust
Assistant Examiner — James R Hakomaki
(74) Attorney, Agent, or Firm — Muncy, Geissler, Olds & Lowe, PC (57) ABSTRACT

A filling device is provided, including a pump and a liquid transferring handle. The liquid transferring handle includes a grip portion, an inlet portion, an outlet portion which is in communication with the inlet portion, a channel which is in communication between the inlet portion and the outlet portion, and a window through which an interior of the channel is viewable. The inlet portion is detachably connected and in communication with the pump.

8 Claims, 7 Drawing Sheets

(56) References Cited

U.S. PATENT DOCUMENTS

| | | | | |
|---|---|---|---|---|
| 4,231,375 A * | 11/1980 | Boehringer | ............ | A63B 23/18 |
| | | | | 235/90 |
| 6,212,957 B1 * | 4/2001 | McCombs | ................ | G01F 1/22 |
| | | | | 73/1.33 |
| 7,140,262 B1 * | 11/2006 | Vaughn | ..................... | G01F 1/22 |
| | | | | 73/861.57 |
| 7,367,366 B2 * | 5/2008 | Liao | ........................ | F04B 33/00 |
| | | | | 141/26 |
| 7,549,348 B2 * | 6/2009 | Brown | ...................... | G01F 1/28 |
| | | | | 73/861.56 |
| 9,222,471 B2 * | 12/2015 | Liao | ........................ | F04B 39/14 |
| 2005/0180806 A1 * | 8/2005 | Green | ................... | B05C 17/015 |
| | | | | 401/119 |
| 2012/0008313 A1 * | 1/2012 | Plumb | ...................... | B44C 5/00 |
| | | | | 362/184 |
| 2012/0234935 A1 * | 9/2012 | Sun | ...................... | B05B 7/2443 |
| | | | | 239/10 |
| 2012/0255893 A1 * | 10/2012 | Le Clair | ............... | B01F 1/0027 |
| | | | | 210/167.11 |
| 2012/0275841 A1 * | 11/2012 | Jimenez | ............. | A46B 11/0065 |
| | | | | 401/140 |
| 2016/0166761 A1 * | 6/2016 | Piehl | ................... | A61M 5/1408 |
| | | | | 604/506 |
| 2017/0145993 A1 * | 5/2017 | Liao | ..................... | F04B 33/005 |

* cited by examiner

FILLING DEVICE

BACKGROUND OF THE INVENTION

Field of the Invention

The present invention relates to a filling device.

Description of the Prior Art

Generally, liquid filling, such as battery acid filling for vehicles, is usually carried out by direct pouring or using a pump with a tube to guide liquid to flow into a target container. Direct pouring is laborious and time consuming when it is necessary to fill a large amount of liquid. A conventional filling device with a pump can fill liquid continuously; however, a liquid level in the target container is unable to be observed, which results in liquid leakage. In addition, the tube used with the pump is soft, inconvenient to be held, and cannot be stably connected with a liquid inlet of the target container.

The present invention is, therefore, arisen to obviate or at least mitigate the above-mentioned disadvantages.

SUMMARY OF THE INVENTION

The main object of the present invention is to provide a filling device, wherein a state of liquid filling in the filling device is viewable.

To achieve the above and other objects, the present invention provides a filling device, including a pump and a liquid transferring handle. The liquid transferring handle includes a grip portion, an inlet portion, an outlet portion which is in communication with the inlet portion, a channel which is in communication between the inlet portion and the outlet portion, and a window through which an interior of the channel is viewable. The inlet portion is detachably connected and in communication with the pump.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
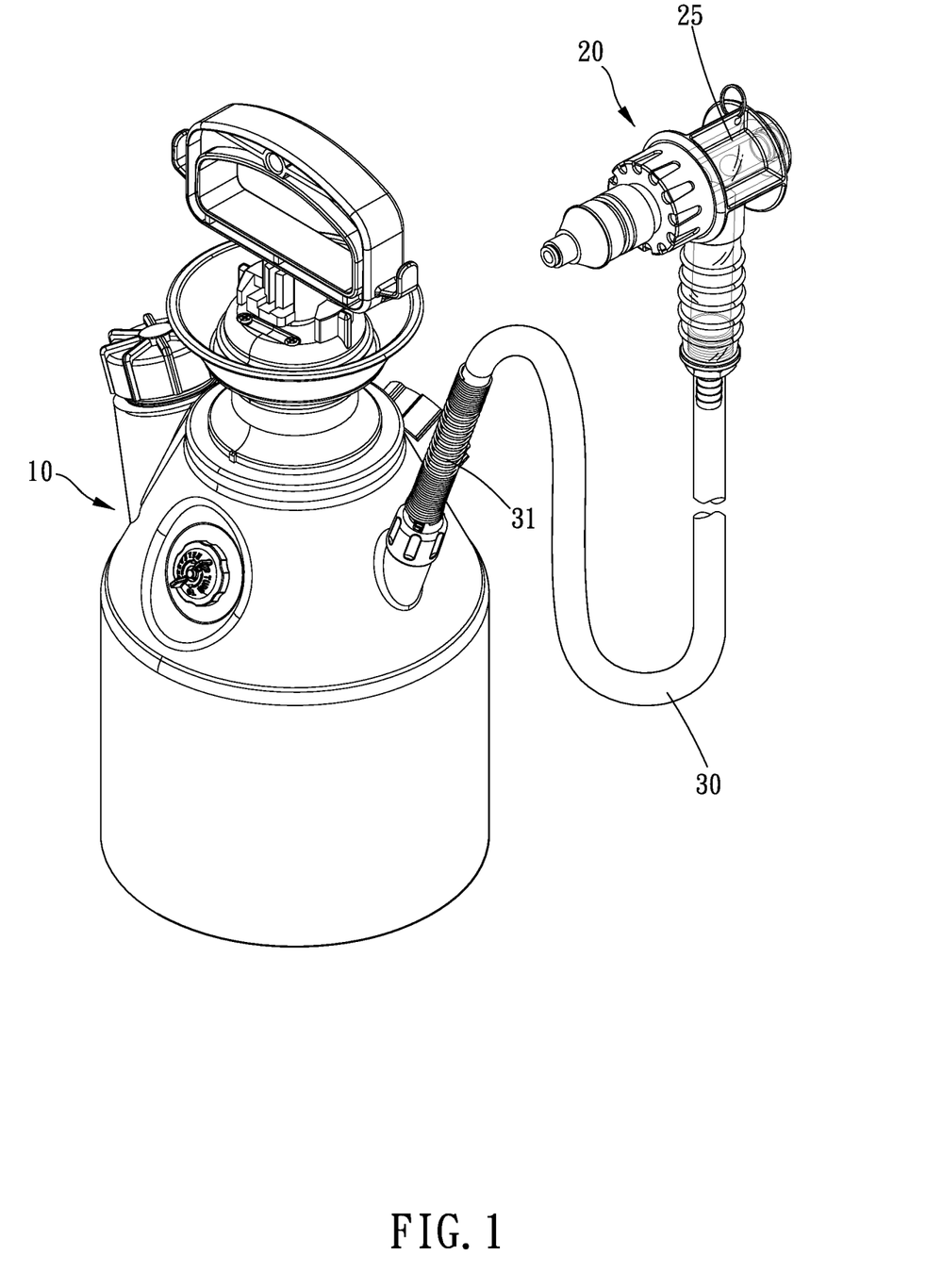
FIGS. 1 and 2 are perspective views of a preferable embodiment of the present invention.
Figure 2:
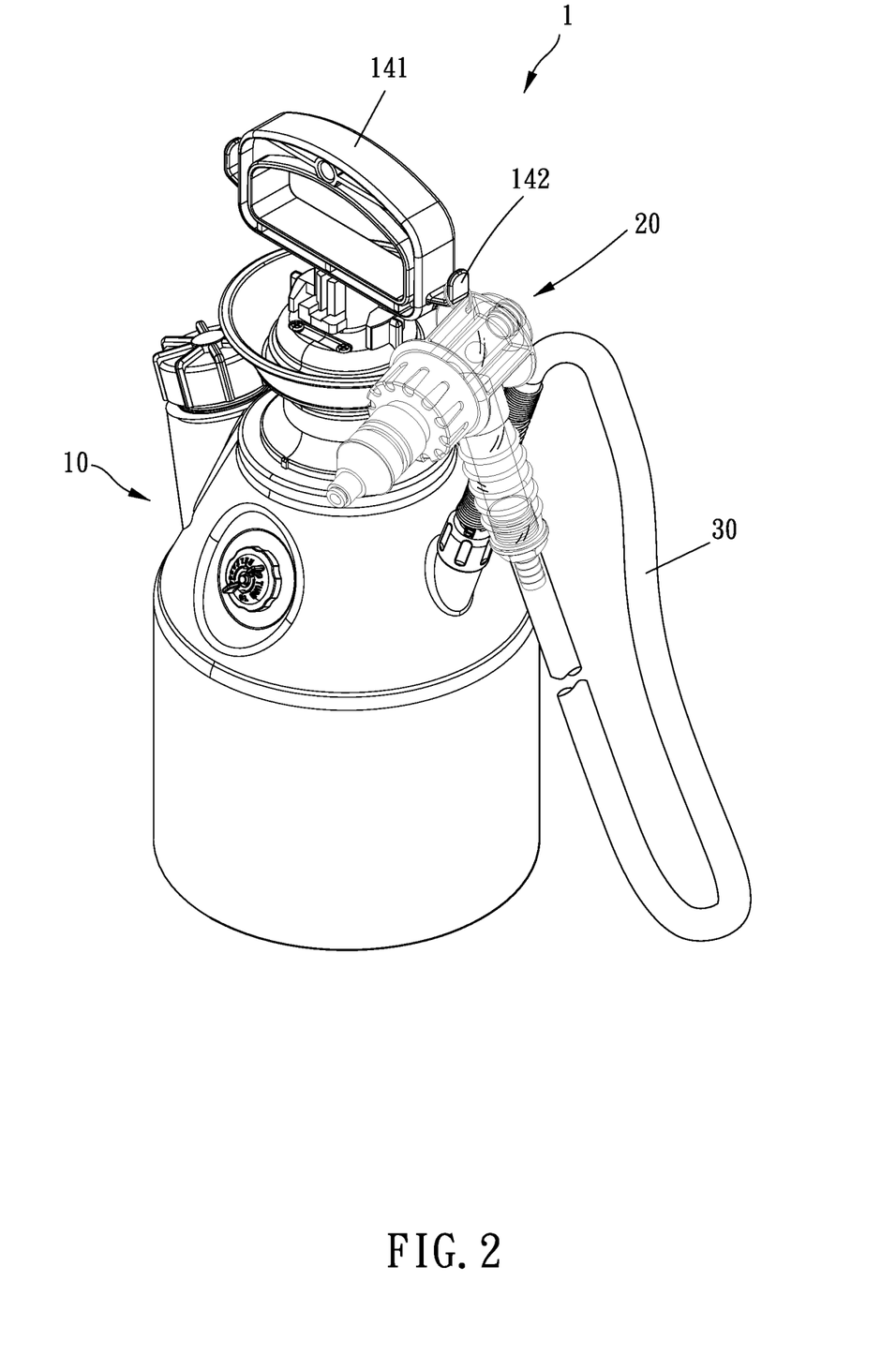
Figure 3:
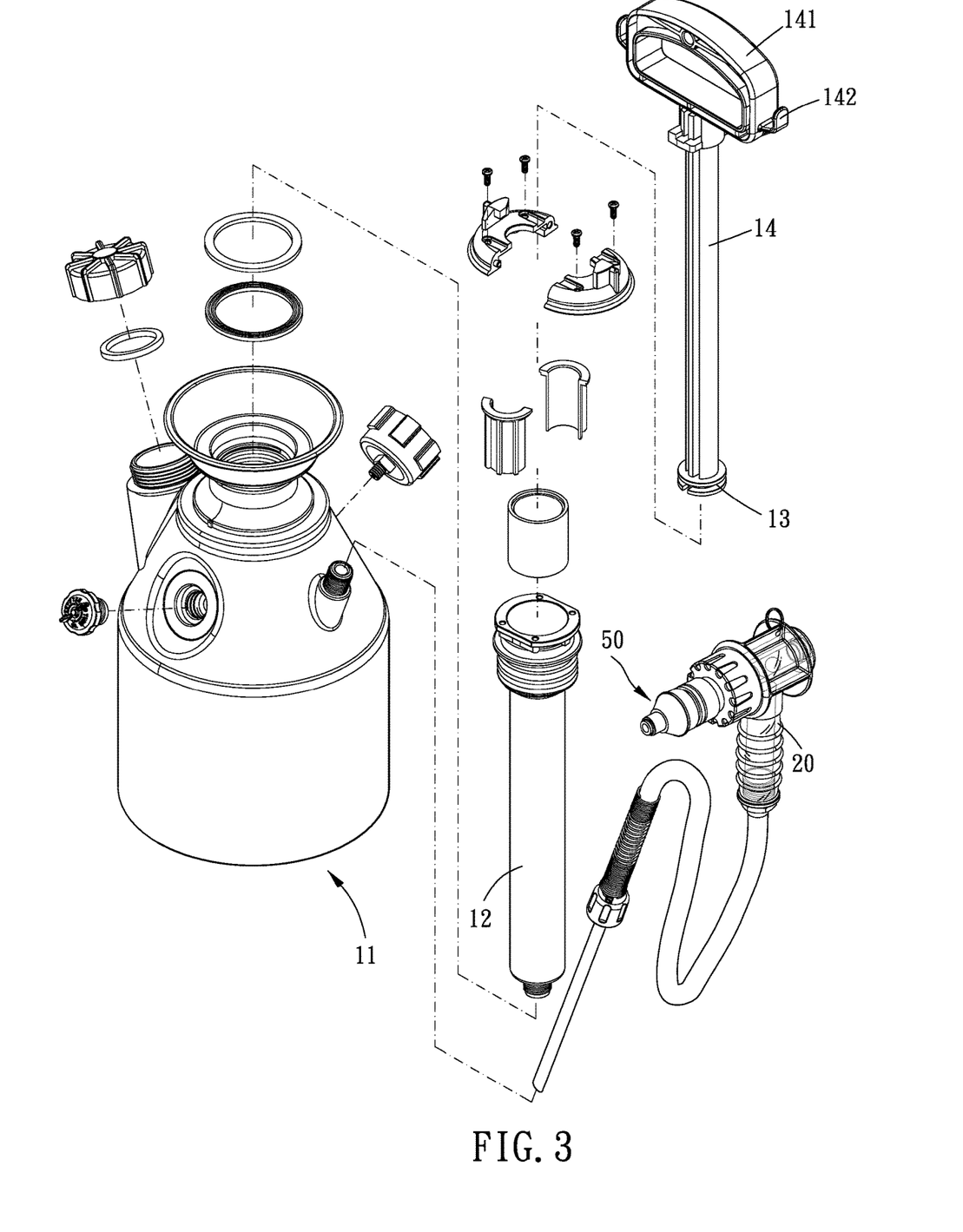
FIG. 3 is an exploded perspective view of a pump of a preferable embodiment of the present invention.
Figure 4:
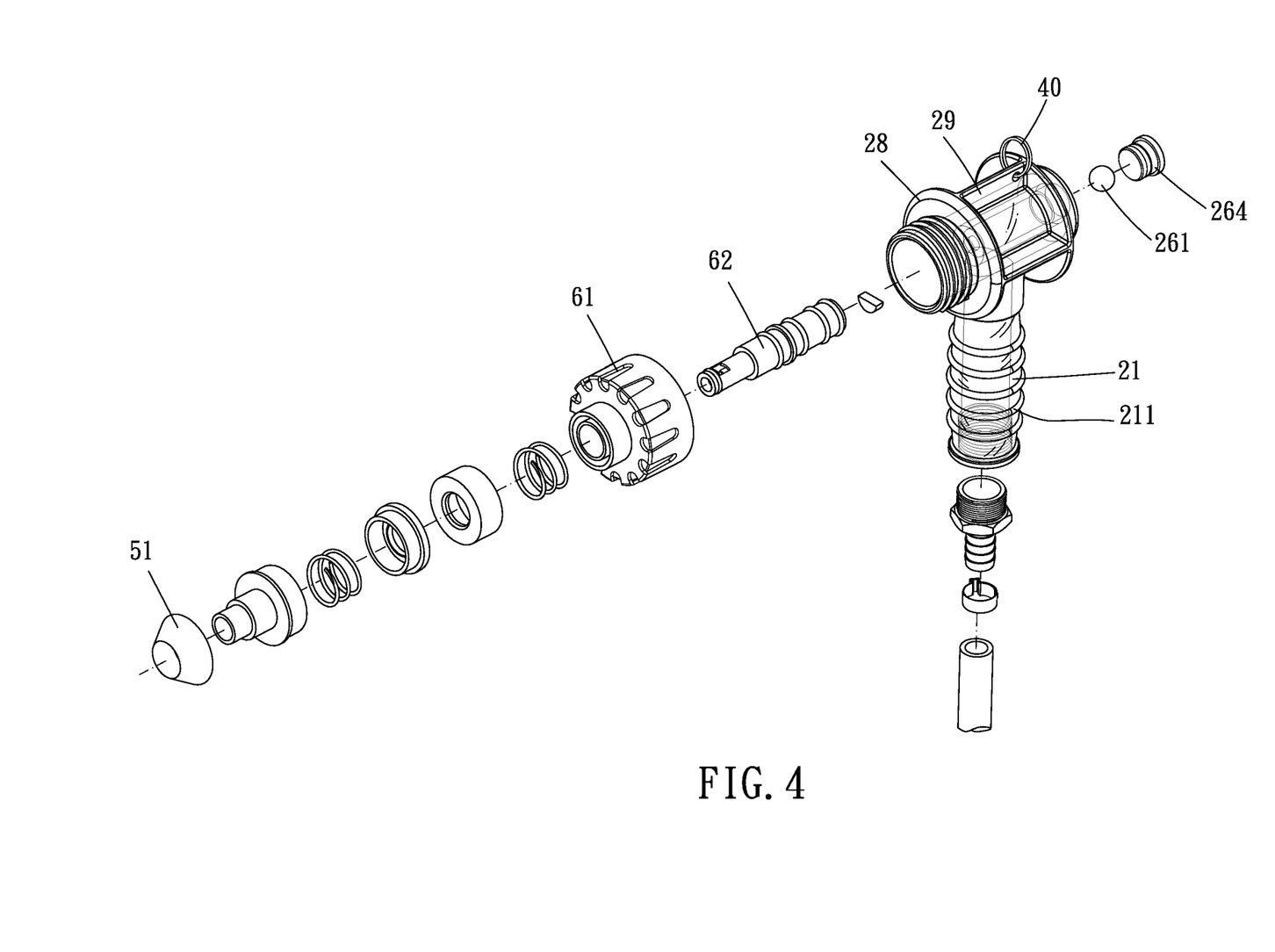
FIG. 4 is an exploded perspective view of a liquid transferring handle of a preferable embodiment of the present invention.
Figure 5:
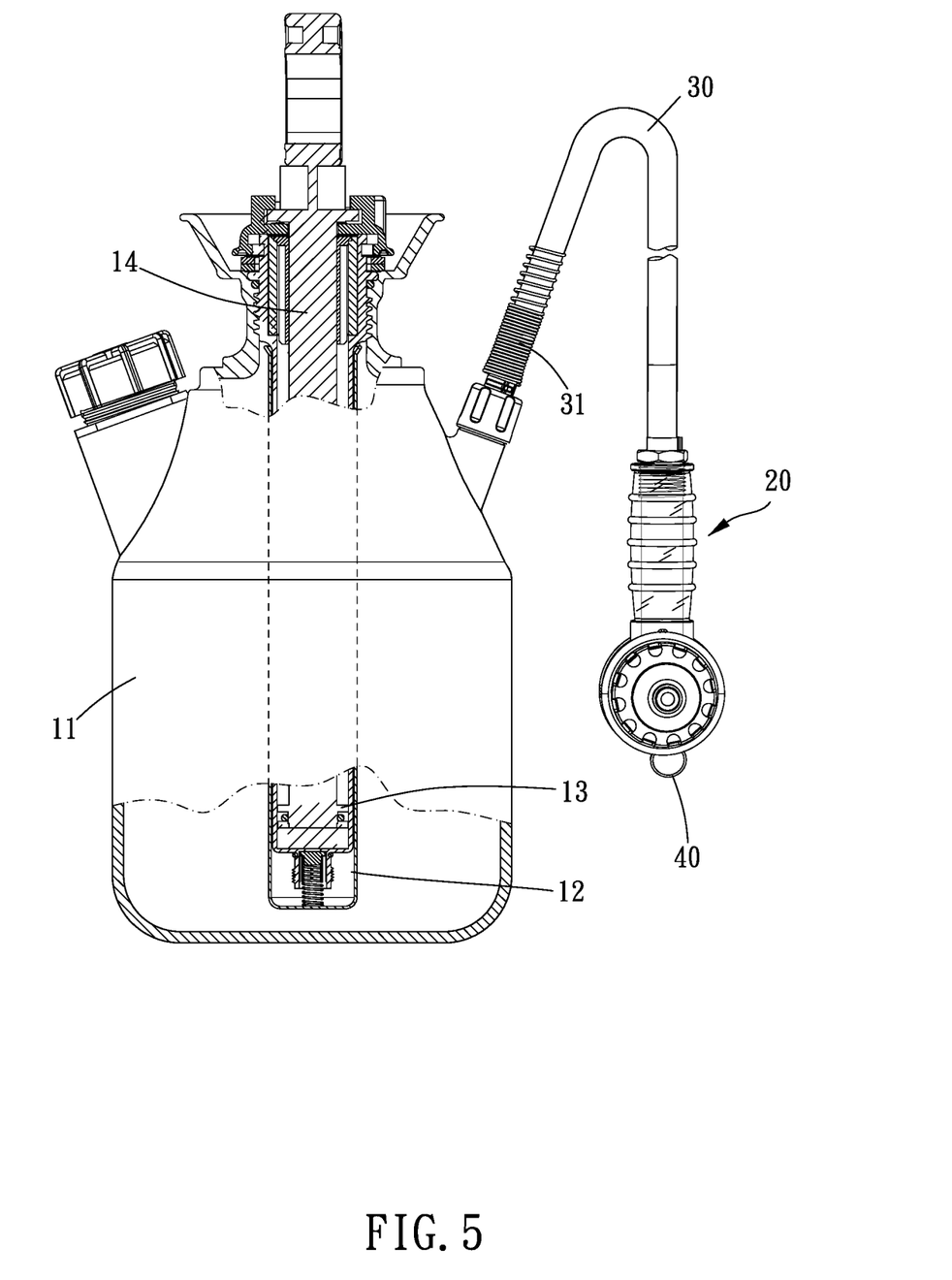
FIG. 5 is a partial cross-sectional view of a preferable embodiment of the present invention.
Figure 6:
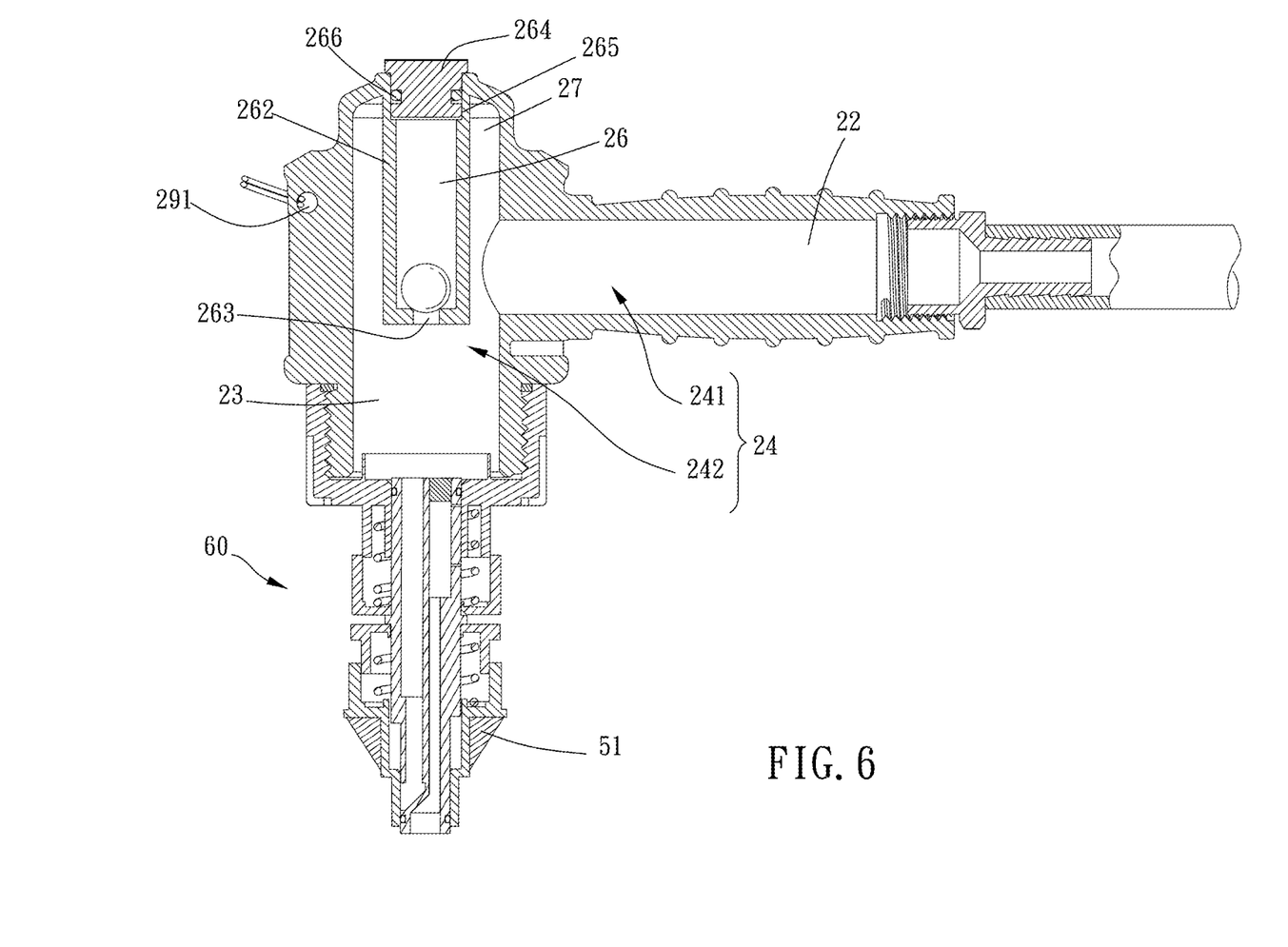
FIGS. 6 and 7 are schematic diagrams of a liquid transferring handle of a preferable embodiment of the present invention in use.
Figure 7:
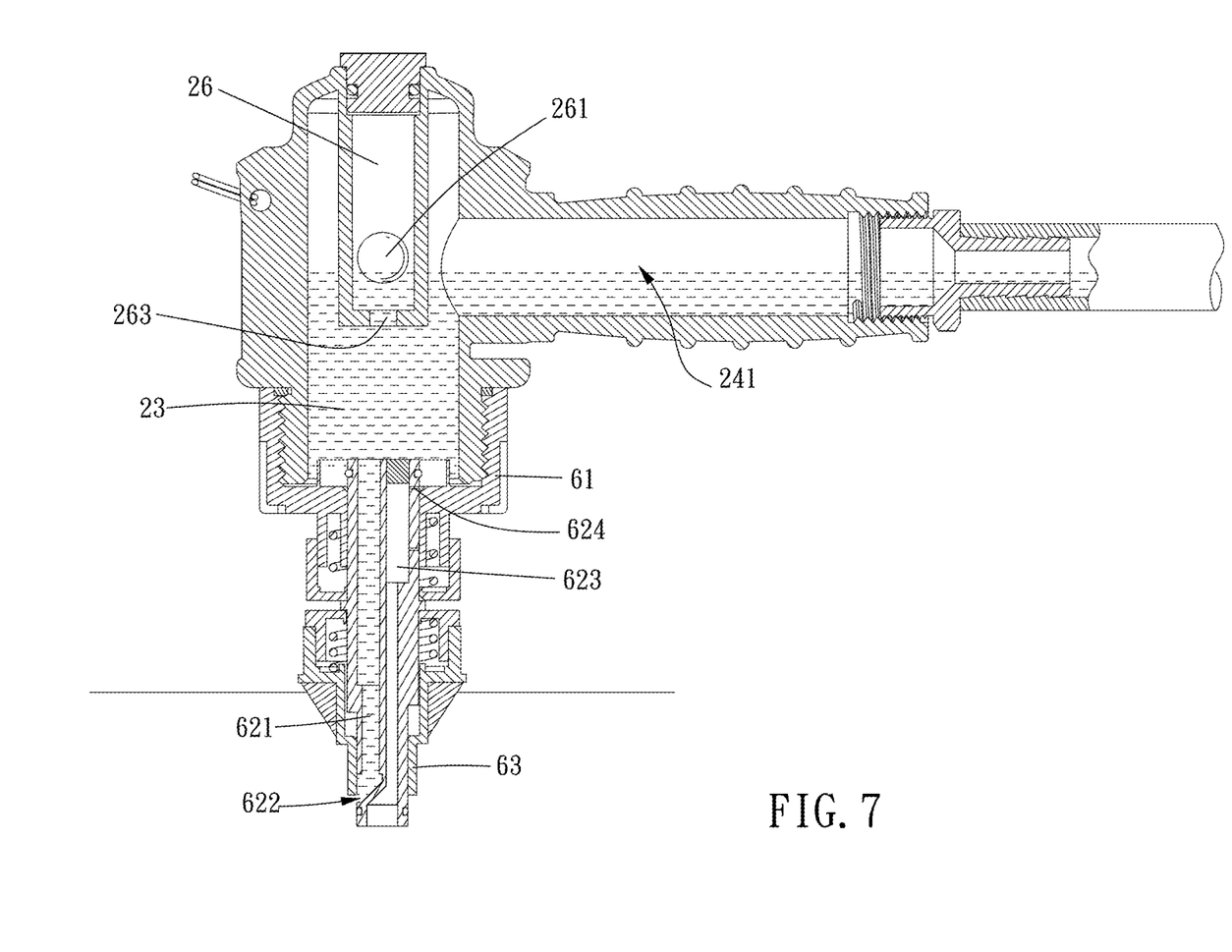

Please refer to FIGS. 1 to 7 for a preferable embodiment of the present invention. A filling device 1 of the present invention includes a pump 10 and a liquid transferring handle 20.

The liquid transferring handle 20 includes a grip portion 21, an inlet portion 22, an outlet portion 23 which is in communication with the inlet portion 22, a channel 24 which is in communication between the inlet portion 22 and the outlet portion 23, and a window 25 through which an interior of the channel 24 is viewable. The inlet portion 22 is detachably connected and in communication with the pump 10. Therefore, liquid can be drawn from the pump 10 to an outer container and the interior of the channel 24 is viewable.

The inlet portion 22 may be connected and in communication with the pump 10 by a flexible tube 30. The flexible tube 30 preferably has a protecting member 31 which is sleeved on a portion where the flexible tube 30 is connected with the pump 10. The protecting member 31 may be a coil spring or a rubber tube so as to prevent the flexible tube 30 from being damaged by excessive bending. The pump 10 includes a cylinder body 11 configured to received liquid, a piston tube 12 disposed in the cylinder body 11, a piston 13 sealingly connected with the piston tube 12 and a pushrod 14 which is connected with the piston 13 and reciprocatable in the piston tube 12. A volume of the piston tube 12 is changeable by moving the piston 13 by the pushrod 14 so as to provide gas pressure into the cylinder body 11. Therefore, liquid in the cylinder body 11 can be transferred outwardly through the flexible tube 30 and the liquid transferring handle 20.

The liquid transferring handle 20 further includes a receiving room 26 extending within the channel 24 and a floatable ball 261 which is received in the receiving room 26. The receiving room 26 includes a cavity body 262 defining the receiving room 26 and at least one through hole 263 which is disposed on an end portion of the cavity body 262 adjacent to the outlet portion 23. Preferably, the cavity body 262 can be seen through and the window 25 corresponds to the receiving room 26. The at least one through hole 263 may be disposed on a bottom or a lateral side of the cavity body 262 and is configured to allow liquid to flow into the receiving room 26. Therefore, when the liquid level in the outer container is raised to a certain height, the liquid flows into the receiving room 26 through the at least one through hole 263 and floats the floatable ball 261, which indicates that the outer container is full. Preferably, the cavity body 262 at least partially disposed within the outlet portion 23 and the at least one through hole 263 is open toward the outlet portion 23, which can accurately reflect the liquid level in the channel 24.

Specifically, the channel 24 includes a first portion 241 and a second portion 242 which are laterally connected with each other, and the chamber 26 and the floatable ball 261 are disposed in the second portion 242. As viewed in an extending direction of the first portion 241, the at least one through hole 263 is at least partially overlapped with a wall portion which defines the first portion 241 and is adjacent to the outlet portion 23, which can prevent the liquid level in the channel 24 from being too high and prevent the liquid from flowing back to the inlet portion 22.

The receiving room 26 further includes a plug member 264 disposed on the cavity body 262. The cavity body 262 is preferably integrally formed as a part of the liquid transferring handle 20 and has an opening 265 away from the outlet portion 23, and the plug member 264 is detachably plugged within the opening 265 for easy cleaning and parts replacement. Preferably, a sealing ring 266 is disposed between the plug member 264 and the cavity body 262 to avoid liquid leakage.

The liquid transferring handle 20 further includes a connecting portion 27 which extends coaxially with the outlet portion 23 and protrudes away from the outlet portion 23 and beyond the inlet portion 22. The connecting portion 27 is connected with the grip portion 21 and surrounds the wall body 262. The connecting portion 27 has the window 25 disposed thereon and the floatable ball 261 is viewable through the window 25.

The liquid transferring handle 20 further includes two flanges 28 which radially protrude on opposite sides of the window 25 and a plurality of ribs 29 which are connected between the two flanges 28 so as to provide good structural strength and prevent the window 25 from being abraded to affect visibility or being damaged by collision. Preferably, at least one of the two flanges 28 and the plurality of ribs 29 has an aperture 291 which is configured for a hanging member 40 to be disposed therethrough for easy storage. In this embodiment, the aperture 291 is disposed on one of the plurality of ribs 29 and with a hanging member 40 disposed therethrough. A holding portion 141 of the pushrod 14 has at least one hook 142 extending therefrom. The liquid transferring handle 20 is hangable on the at least one hook 142 by the hanging member 40 for easy storage and taking. However, the hook may be disposed on any positions of the pump. The grip portion 21 laterally extends between the two flanges 28 and has a plurality of ribs 211 circumferentially disposed thereon for easy gripping.

The liquid transferring handle 20 is integrally formed of one piece, which increases structural integrity and avoids liquid leakage. The liquid transferring handle 20 further has a nozzle portion 50 which is tapered toward a direction away from an opening of the outlet portion 23 so that the nozzle portion 50 is suitable to any of outer containers having different opening sizes. In this embodiment, the outlet portion 23 is connected with a valve assembly 60. The nozzle portion 50 is disposed on the valve assembly 60 and includes an elastic washer 51 which is tapered in a direction away from the opening of the outlet portion 23 so as to be tightly connected with a liquid inlet of the outer container. However, the liquid transferring handle may not be connected with the valve assembly; the nozzle portion may extend integrally from the liquid transferring handle or be additionally connected with the outlet portion.

Specifically, the valve assembly 60 includes a connecting seat 61 connected with the outlet portion 23, a tubular member 62 disposed on the connecting seat 61 and a sleeving member 63 sleeved on the tubular member 62. The tubular member 62 includes a liquid passage 621 which is in communication with the outlet portion 23, and an end of the liquid passage 621 opposite to the outlet portion 23 has a liquid outlet 622 laterally disposed thereon. The sleeving member 63 is axially slidable relative to the tubular member 62 and selectively closed the liquid outlet 622 so as to avoid liquid leakage. The tubular member 62 preferably further includes a gas passage 623 which is in communication with outer environment and a guiding hole 624 which is configured to communicate the outlet portion 23 with the gas passage 623. The tubular member 62 is axially slidable relative to the connecting seat 61 and selectively closed the guiding hole 624. When the outlet portion 23 is in communication with the gas passage 623 via the guiding hole 624, gas in the outer container is dischargeable through the gas passage 623 and the guiding hole 624 so that liquid and gas can flow smoothly.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A filling device, including:
    a pump;
    a liquid transferring handle, including a grip portion, an inlet portion, an outlet portion which is in communication with the inlet portion, a channel which is in communication between the inlet portion and the outlet portion, and a window through which an interior of the channel is viewable, the inlet portion being detachably connected and in communication with the pump;
    wherein the liquid transferring handle further includes a chamber extending within the channel, a floatable ball which is freely movable and received in the chamber, a wall body defining the chamber, at least one through hole which is disposed on an end portion of the wall body adjacent to the outlet portion and a connecting portion connected with the grip portion and surrounding the wall body, the window is disposed on the connecting portion and a position of the window corresponds to a position of the chamber, and the floatable ball is viewable through the window;
    wherein the channel includes a first portion and a second portion which are laterally connected with each other, the chamber and the floatable ball are disposed in the second portion, as viewed in an extending direction of the first portion, the at least one through hole is at least partially overlapped with a wall portion which defines the first portion and is adjacent to the outlet portion.

2. The elongate light of claim 1, wherein the wall body at least partially disposed within the outlet portion and the at least one through hole is open toward the outlet portion.

3. The elongate light of claim 1, wherein the chamber further includes a plug member disposed on the wall body, the wall body is integrally formed as a part of the liquid transferring handle and has an opening away from the outlet portion, and the plug member is detachably plugged within the opening.

4. The elongate light of claim 1, wherein the connecting portion extends coaxially with the outlet portion and protrudes away from the outlet portion and beyond the inlet portion.

5. The elongate light of claim 1, wherein the liquid transferring handle is integrally formed of one piece and further has a nozzle portion which is tapered toward a direction away from an opening of the outlet portion.

6. The elongate light of claim 1, wherein the liquid transferring handle further includes two flanges which radially protrude on opposite sides of the window and a plurality of ribs which are connected between the two flanges.

7. The elongate light of claim 6, wherein at least one of the two flanges and the plurality of ribs has an aperture which is configured for a hanging member to be disposed therethrough.

8. The elongate light of claim 1, wherein at least a part of the wall body protrudes into the outlet portion and the at least one through hole is open toward the outlet portion; the chamber further includes a plug member disposed on the wall body, the wall body extends integrally from the liquid transferring handle and has an opening away from the outlet portion, the plug member is detachably plugged within the opening and a sealing ring is disposed between the plug member and the wall body; the connecting portion extends coaxially with the outlet portion and protrudes beyond the inlet portion; the liquid transferring handle is made in one piece and further has a nozzle portion which is tapered toward a direction away from an opening of the outlet portion; the liquid transferring handle further includes two flanges which are radially and protrudingly disposed on opposite sides of the window and a plurality of ribs which are connected between the two flanges; the grip portion laterally extends between the two flanges and has a plurality of ribs circumferentially disposed thereon; at least one of the two flanges and the plurality of ribs has an aperture which is configured for a hanging member to be disposed therethrough.

* * * * *